US006190476B1

(12) United States Patent
Seecharan et al.

(10) Patent No.: US 6,190,476 B1
(45) Date of Patent: Feb. 20, 2001

(54) GYPSUM BOARD MANUFACTURE WITH CO-ROTATING SPREADER ROLLER

(75) Inventors: Tony Seecharan, Burlington (CA); Ronald Bal, Greenland, NH (US)

(73) Assignee: Westroc Inc., Mississauga (CA)

(*) Notice: Under 35 U.S.C. 154(b), the term of this patent shall be extended for 0 days.

(21) Appl. No.: 09/182,479

(22) Filed: Oct. 30, 1998

(30) Foreign Application Priority Data

Jul. 8, 1998 (CA) ........ 2242746

(51) Int. Cl.[7] ........ B32B 13/00; B32B 31/06; B32B 31/08; B32B 31/12

(52) U.S. Cl. ........ 156/39; 118/33; 156/44; 156/346; 156/356; 156/361; 156/494; 427/172

(58) Field of Search ........ 156/39, 43, 44, 156/346, 347, 348, 356, 361, 494, 495; 118/33; 427/172, 176

(56) References Cited

U.S. PATENT DOCUMENTS

| | | | |
|---|---|---|---|
| 1,428,827 | 9/1922 | Brookby . | |
| 1,750,621 | 3/1930 | Brookby . | |
| 1,859,853 | 5/1932 | Thomson . | |
| 1,953,589 | 4/1934 | Camp . | |
| 2,940,505 | 6/1960 | Brothers . | |
| 4,407,222 | 10/1983 | Kimura et al. . | |
| 4,631,097 * | 12/1986 | Kossuth | 156/44 |
| 5,632,848 * | 5/1997 | Richards et al. | 156/346 |
| 5,714,032 * | 2/1998 | Ainsley et al. | 156/346 |
| 5,718,797 | 2/1998 | Phillips et al. . | |

* cited by examiner

*Primary Examiner*—Steven D. Maki
(74) *Attorney, Agent, or Firm*—Ridout & Maybee

(57) ABSTRACT

Methods and apparatus are disclosed for producing gypsum board having at least one facing sheet, a core of cementitious material such as low density gypsum, and an intermediate layer of bond promoting material, such as higher density gypsum located therebetween. The apparatus includes a forming table having a transverse gap. The facing sheet travels along the forming table over the gap. A spreader roller has an outer surface extending partially into the gap to depress the facing sheet. The bond promoting material is deposited on the facing sheet upstream of the spreader roller and the spreader roller outer surface rotates in the same direction as the facing sheet to coat the facing sheet with the bond promoting material. The core layer material is deposited on the facing sheet downstream of the spreader roller on top of the bond promoting coating. The speed of the spreader roller, the tension in the facing sheet, and the viscosity of the bond promoting material are varied within predetermined limits to adjust the thickness of the bond promoting material layer and prevent build up of said material on the spreader roller.

20 Claims, 3 Drawing Sheets

GYPSUM BOARD MANUFACTURE WITH CO-ROTATING SPREADER ROLLER

FIELD OF THE INVENTION

This invention relates to gypsum board manufacturing, and in particular, to the manufacturer of gypsum board of the type having a low density core and higher density gypsum layers between the core and the cover sheets.

BACKGROUND OF THE INVENTION

In the manufacturer of gypsum board, whether it be wall board or ceiling board or used for some other purpose, it is desirable to use a low density gypsum to reduce the overall weight of the resulting board. The density of the gypsum can be reduced by introducing a foaming agent into the slurry that ultimately results in the core of the gypsum board. A problem with doing this, however, is that the low density gypsum does not adhere as well to the paper cover sheets that are typically used to produce the gypsum board.

One method of overcoming this adhesion problem apart from adding expensive adhesive or bond promoting agents to the gypsum slurry, is to coat the cover sheets with normal or higher density gypsum to form a bonding layer between the low density core and the paper cover sheets. Various methods have been tried to apply the higher density gypsum bonding layer to the cover sheets. One method is to spray the high density gypsum onto the cover sheets before applying the core gypsum. A difficulty with this approach, however, is that it is very difficult to get an even high density layer. The spraying apparatus is also prone to plugging problems.

Another approach is shown in the U.S. Camp Pat. No. 1,953,589. This patent shows the use of an oscillating and rotating roller that rubs the slurry into the cover sheet to make the slurry penetrate the cover sheet. The cover sheet must be backed up under the coating roller by a forming table or by a pressure roller in order for the coating roller to be able to apply sufficient pressure to rub the slurry into the cover sheet. A difficulty with this approach, however, is the high pressure required between the coating roller and the forming table or pressure roller. This creates paper break problems if foreign objects or lumps pass under the coating roller.

Another approach is to use multiple coating rollers to spread the high density gypsum over the cover sheet. An example of this is shown in the U.S. Brothers Pat. No. 2,940,505. In this patent, coating rollers bear against the cover sheets which are supported on flat table surfaces located beneath the coating rollers. A difficulty with this method, however, is that the high density gypsum tends to build up on the coating rollers. This can cause uneven coating thicknesses, or worse, lumps of partially set gypsum can form which get jammed beneath the coating rollers and cause paper breaks.

In U.S. Pat. No. 5,718,797 issued to John L. Phillips et al., the cover sheet passes beneath a counter-rotating coating roller, and a pressure roller located below the cover sheet and located upstream of the coating roller presses the cover sheet into engagement with the coating roller. The cover sheet so pressed against the coating roller causes the cover sheet to wipe the coating roller clean. While this may alleviate the problem of gypsum build up on the coating roller, there is still the problem of running the cover sheet through a high pressure nip between the coating and pressure rollers, which could cause paper breaks or other difficulties.

In the present invention, the high density layer is achieved by using a spreader roller without a backing or pressure roller. The spreader roller depresses the paper sheet below the forming table, and a combination of the roller speed and the tension in the paper sheet keeps the coating roller clean.

SUMMARY OF THE INVENTION

According to one aspect of the invention, there is provided apparatus for producing gypsum board. The apparatus comprises an elongate table having an upper surface for supporting a continuously moving facing sheet thereon. The table has a transverse gap therein dividing the table into an upstream portion and a downstream portion. A transverse spreader roller is located parallel to the upper surface and has an outer surface that extends partially into the gap for depressing the facing sheet below the table upper surface. Means are provided for applying longitudinal tension to the facing sheet to control the pressure of the facing sheet against the spreader roller. Drive means rotate the spreader roller outer surface in the same direction as the facing sheet. Means are provided for depositing a coating slurry onto the facing sheet on the upstream portion of the table. The coating slurry is spread over the facing sheet by the spreader roller. Also means are provided for applying a core slurry onto the facing sheet on the downstream portion of the table on top of the coating slurry.

According to another aspect of the invention, there is provided a method of manufacturing gypsum board of the type having at least one facing sheet, a core layer of cementitious material, and an intermediate layer of bond promoting material located therebetween. The method comprises the steps of providing a forming table having an upstream portion, a downstream portion and a gap therebetween. A facing sheet is moved at a predetermined speed over the forming table passing over the gap. Bond promoting material is deposited on the facing sheet on the upstream portion of the forming table. A co-rotating spreader roller is provided in contact with the facing sheet to spread the bond promoting material over the facing sheet, the spreader roller extending into the gap. The facing sheet is tensioned so that this tension urges the facing sheet against the spreader roller. A core layer material is also applied on top of the bond promoting material on the downstream portion of the forming table.

BRIEF DESCRIPTION OF THE DRAWINGS

Preferred embodiments of the invention will now be described, by way of example, with reference to the accompanying drawings, in which.

DESCRIPTION OF THE PREFERRED EMBODIMENTS

Figure 1:
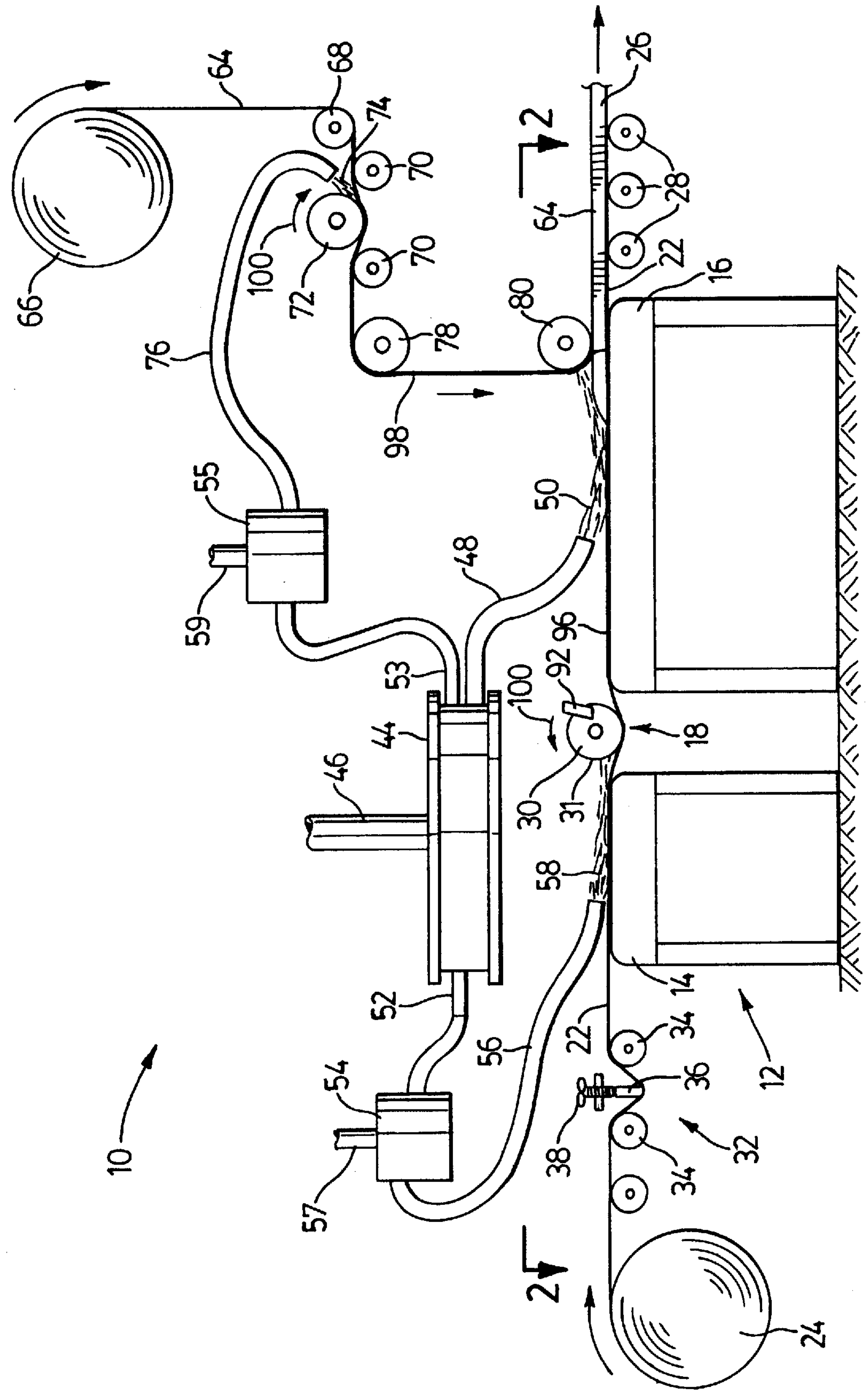
FIG. 1 is an elevational diagrammatic view of a preferred embodiment of a machine for producing gypsum board according to the present invention.

Referring to the drawings, a preferred embodiment of a gypsum board machine according to the present invention is generally indicated by reference numeral 10. For the purposes of this disclosure, the term gypsum board is intended to include any type of gypsum board, whether it be used as wall board or ceiling board, or for any other purpose. Gypsum board machine 10 includes an elongate forming table 12 having an upstream portion 14 and a downstream portion 16 and a transverse gap 18 located therebetween. Forming table 12 has an upper surface 20 on which is supported a facing sheet 22, which is usually formed of paper. Facing sheet 22 is unwound from a supply roll 24 and is pulled along over forming table 12 as part of the gypsum board 26 emerging from gypsum board machine 10. Gypsum board 26 is carried away by a conveyor typically formed of a conveyor belt or a plurality of driven conveyor rollers 28 located downstream of forming table 12. The gypsum in gypsum board 26 is starting to set as it leaves gypsum board machine 10 and is eventually cut into predetermined lengths and delivered to drying ovens to form sheets of gypsum board as desired.

In a typical gypsum board machine producing gypsum board of about 1.2 meters (4 feet) in width and 1.27 cm. (½ inch) in thickness, the speed of facing sheet 22 and thus gypsum board 26 through machine 10 varies from about 45 meters (150 feet) per minute to about 120 meters (400 feet) per minute. For 1.6 cm. (⅝ inch) thick gypsum board, a typical machine speed is about 36 meters (118 feet) per minute. The speed of facing sheet 22 or gypsum board 26 through machine 10 is usually constant and predetermined depending upon the thickness of the gypsum board being produced and the flow rate of the gypsum going into the gypsum board.

A transverse spreader or gauging roller 30 is located parallel to forming table upper surface 20 and has an outer surface 31 that extends partially into gap 18 for a pressing facing sheet 22 below the forming table upper surface 20. Longitudinal tension is applied to facing sheet 20 by a tensioning device 32 and also by being pulled through machine 10 by conveyor 28. Tensioning device 32 includes pair of spaced-apart transverse bars or rollers 34, and a transverse adjustable tension bar 36. Finger tensioners 38 control the lateral off-set of tension bar 36 to vary the drag force caused by tension bar 36 on facing sheet 22 and thus the tension in facing sheet 22.

The tension in facing sheet 20 can be quantified by measuring with strain gauges the strain applied by the facing sheet to one of the tensioning rollers 34, preferably the roller 34 immediately upstream of gauging roller 30. The measured pounds strain can then be divided by the paper's width to give a reading in pounds per linear inch (pli). Preferred ranges of tension for 1.27 cm (½ inch) thick gypsum board are discussed further below.

As mentioned above, spreader roller 30 is positioned so that its surface 31 extends partially into gap 18 or below forming table upper surface 20. As a result of this, applying longitudinal tension to facing sheet 22 causes facing sheet 22 to be urged against spreader roller 30. In fact, it will be noted that it is the tension in the facing sheet 22 that presses the facing sheet against the spreader roller 30. There is nothing, i.e., there is no backing or pressure roller located underneath facing sheet 22 to press it into engagement with spreader roller 30. Similarly, no part of the forming table or any backing plate is located under coating roller 30. Preferably, only the longitudinal tension in facing sheet 22 thus controls the pressure of facing sheet 22 against spreader roller 30. However, a backing roller or backing plate could be located under facing sheet 22 below spreader roller 30, if desired. Normally, only an increase in longitudinal tension in facing sheet 22 increases the pressure of facing sheet 22 against spreader roller 30, and vice-versa.

Figure 2:
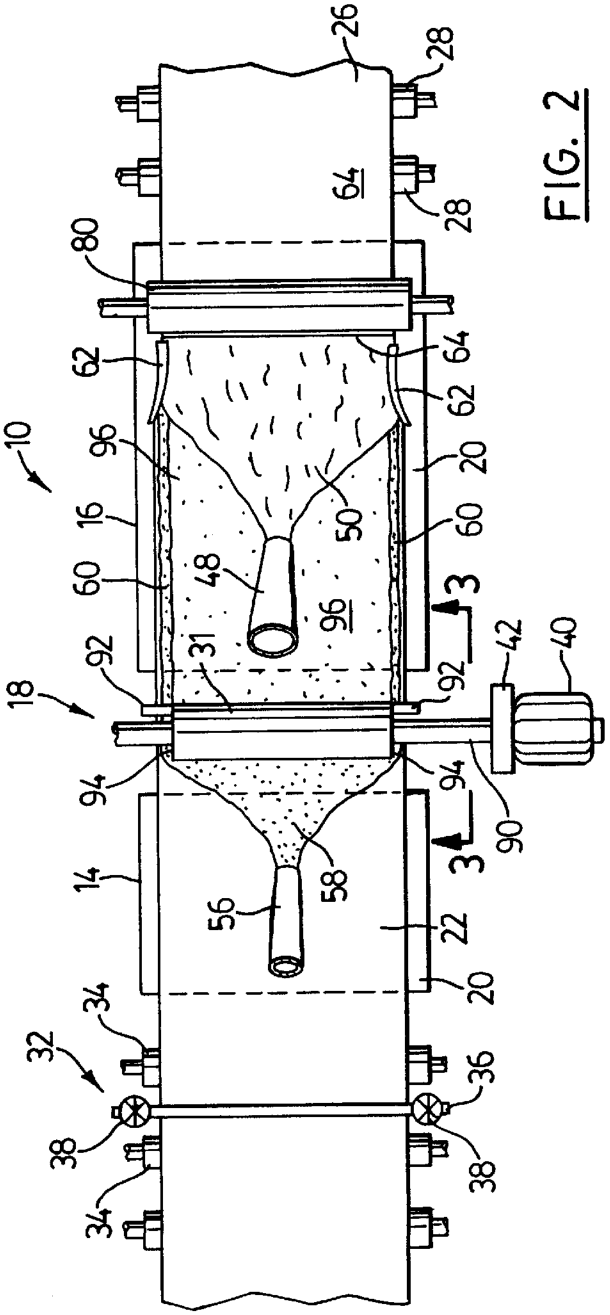
FIG. 2 is a plan view taken along lines 2—2 of FIG. 1.

As seen best in FIG. 2, spreader roller 30 is driven by a motor 40 and a gear box 42. Motor 40 and gear box 42 form a variable speed drive and typically rotate spreader roller 30 at speeds between about 40 and 475 rpm, and preferably between about 75 and 300 rpm. Roller 30 is driven so that its outer surface 31 travels in the same direction as facing sheet 22, in which case roller 30 is referred to as a co-rotating spreader roller. Spreader roller 30 is preferably a smooth polished chromed roller about 15 cm. (6 inches) in diameter. As such, the outer surface 31 of spreader roller 30 travels typically between about 20 meters (65 feet) per minute and 230 meters (750 feet) per minute. The surface speed of roller 30 should be at least as fast as the speed of facing sheet 22, and preferably is at least slightly faster as a minimum speed. For 1.27 cm (½ inch) gypsum board, with a 15 cm (6 inch) spreader roller, the surface speed of the spreader roller preferably is between about 50 meters (160 feet) and 167 meters (550 feet) per minute where the facing sheet speed is between 45 meters (150 feet) and 120 meters (400 feet) per minute.

Gypsum for gypsum board 26 is supplied by a conventional mixer 44. The ingredients for the gypsum slurries are fed to mixer 44 through one or more conduits 46. These ingredients normally include a foaming agent and the main output 48 from mixer 44 is a low density core slurry 50 which is deposited onto facing sheet 22 downstream of spreader roller 30. Part of the foamed gypsum slurry produced by mixer 44 is taken off by extractors 52 and 53 and delivered to densification mixers 54 and 55, which density or beat the air bubbles out of the slurry. The higher density or coating slurry from densification mixer 54 is delivered by a conduit 56 to be deposited on facing sheet 22 upstream of spreading roller 30. Similarly, the high density or coating slurry from densification mixer 55 is used to coat a cover sheet 64 for gypsum board 26. Conduits 57 and 59 communicate with densification mixers 54 and 55 to add additional water to the slurry therein for varying the viscosity of the coating slurries, as discussed further below.

As seen best in FIG. 2, the higher density coating slurry 58 is spread laterally or transversely by spreading roller 30. A portion of this slurry passes around the ends of spreader roller 30 to form high density edge strips 60. The peripheral edges of facing sheet 22 are folded up and over by folding shoes 62, and the high density edge strips 60 ultimately become hard edges for gypsum board 26 after backing sheet or cover 64 is applied as will be described next below.

As seen best in FIG. 1, a backing or cover sheet 64 is supplied to gypsum board machine 10 from a supply roll 66. Cover sheet 64 passes around an idler roller 68 and over two spaced-apart table rollers 70. A second spreader roller 72, which is similar to spreader roller 30, depresses cover sheet 64 between the two table rollers 70. A second supply of higher density coating slurry 74 is delivered behind spreader roller 72 by a conduit 76 communicating with densification mixer 55. Alternatively, a single densification mixer could be used instead of two densification mixers 54 and 55, with the single densification mixer supplying both conduits 56 and 76, if desired. Coating slurry 74 is spread laterally to coat cover sheet 64 by spreader roller 72, but the higher density coating slurry does not normally run around the edges of spreader roller 72 to form higher density edges as is the case with spreader roller 30. The coated cover sheet 64 then passes over an idler roller 78 and down to a metering roller 80, the latter controlling the ultimate thickness of gypsum board 26.

Figure 3:
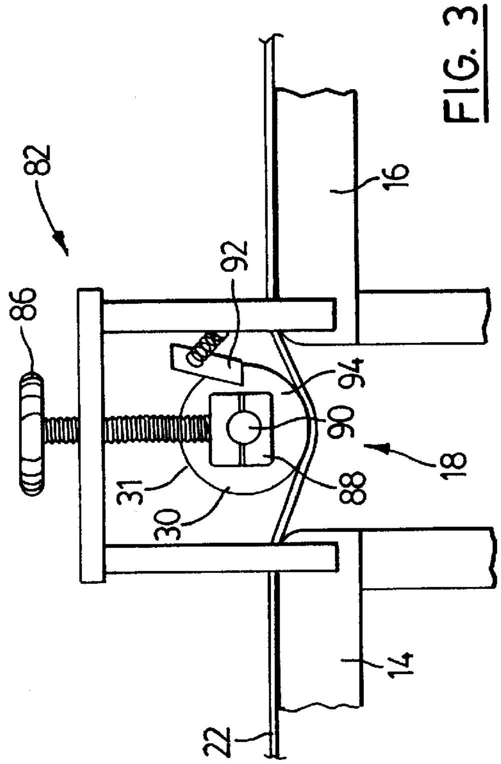
FIG. 3 is an enlarged elevational view taken in the direction of arrows 3—3 of FIG. 2 showing another embodiment for controlling the tension in the facing sheets.

Referring next to FIG. 3, an alternative embodiment for tensioning facing sheet 22 is shown in the form of an adjustment mechanism 82. Adjustment mechanism 82 includes an inverted U-shaped frame 84 located at each end of spreader roller 30 and attached to table portions 14, 16. A screw adjuster 86 is mounted in frame 84 and attached to bearing blocks 88 in which the spindle 90 of spreader roller 30 is mounted. By turning screw adjuster 86, spreader roller 30 is moved up and down thereby adjusting the tension in facing sheet 22. Where adjustment mechanism 82 is used, the bar tensioning device 32 may be eliminated, or both devices may be used in conjunction, if desired. A roller type tensioning device such as mechanism 82 can also be used in place of tension bar 36, if desired. A tensioning device such as 32 or 82 can also be used on the cover sheet 64, if desired.

FIG. 3 also shows spring loaded end scraper blades 92 bearing against opposed ends or end faces 94 of spreader roller 30 to keep end faces 94 clean. Since coating slurry 58 flows around the ends 94 of spreader roller 30, this slurry can be picked up by end faces 94. Without scrapers 92, this slurry could begin to set and migrate to the outer surface 31 of spreader roller 30 causing undesirable build up.

In operation, after gypsum board machine 10 is started up and the flow of coating slurries 58 and 74 and core slurry 50 is started, spreader roller 30 coats facing sheet 22 with a thin high density layer 96, spreader roller 72 coats cover sheet 64 with a thin high density layer 98, and the low density core 50 is filled in therebetween by the action of metering roller 80. The speed of rotation of coating rollers 30 and 72 and the tension in facing sheet 22 and cover sheet 64 is adjusted to give the desired thickness to high density layers 96 and 98. The viscosity of coating slurries 58 and 74 can also be adjusted for the same purpose. Spreader rollers 30 and 72 are rotated in the co-rotational direction as indicated by arrows 100. Increasing the speed of rotation of spreader rollers 30 and 72 causes the thickness of high density layers 96 and 98 to increase, and since the flow of coating slurry 58 is usually kept constant, this also causes the amount of material going into high density edge strips 60 to decrease. Similarly, decreasing the speed of rotation of spreader roller 30 decreases the thickness of high density layer 96 and increases the size of high density edge strips 60. Actually, the rotational speeds of spreader rollers 30 and 72 are set between predetermined minimum and maximum speeds as discussed above, which are such that the surface speed of spreader rollers 30 and 72 are preferably between about 1.2 and 3.5 times the speed of travel of facing sheet 22. The upper limit of the speed of rollers 30 and 72 is determined by observing the slurry on the rollers and the width of high density edge strips 60 in the case of roller 30. If the speed is too high, slurry begins to be flung off the rollers, and the high density edge strips 60 are starved or too narrow, so the maximum speed should be low enough to prevent this. The lower limit or minimum speed is just slightly faster than the speed of travel of the respective facing sheet 22 and cover sheet 64.

Increasing the longitudinal tension in facing sheet 22 and cover sheet 64 decreases the thickness of high density gypsum layers or coatings 96 and 98, and decreasing the longitudinal sheet tension increases the thickness of the high density gypsum layers 96 and 98. Again there are minimum and maximum tension limits. If the tension is too high, the coating thickness will be too low, and there is a danger that the paper will break. If the tension is too low, the coating layers will be uneven across the machine width.

It will be apparent, therefore, that the rotational speed of spreader rollers 30 and 72 and the tension in facing sheet 22 and cover sheet 64 are adjusted together to give the desired coating thickness. It has been found that for gypsum board, the high density coating thickness is preferably between about 0.3 and 0.8 mm. (0.012 and 0.030 inches). At these thicknesses, spreader rollers 30 and 72 are kept clean and free from gypsum buildup on the rollers. Actually, coatings 96 and 98 are formed with longitudinal ripples or ridges. The numerical thicknesses referred to herein, except noted otherwise relate to the minimum lower level or main coating areas, not the ridges.

Coating thickness can also be varied by varying the viscosity of the high density gypsum coming from high density edge mixers 54 and 55. Decreasing the viscosity (increasing fluidity) decreases the thickness of the high density layers, and vice-versa. Decreasing the viscosity also decreases the density of the coating layers and high density edge strips 60. While normally it is desirable to decrease the high density coating thicknesses to reduce the overall weight of the gypsum board, it is also desirable to increase the density of the coating thicknesses, as this gives better paper to core bond and board stiffness. The viscosity cannot be decreased too much, however, or the high density edge strips become too fluid. Increasing the viscosity too much could cause plugging problems and build up on coating rollers 30 and 72.

By way of example, in a typical 1.27 cm (½ inch), 1.2 meter (4 foot) wide gypsum board, with a boardline speed of 45 m/min (150 fpm), the water added to mixer 44 is about 16,640 liters/hour. Additional water is added to densification mixers 54, 55 to control the fluidity or viscosity of the high density gypsum. This additional water ranges from about 35 to 140 liters/hour, and preferably is about 90 liters/hour. Adding more water increases the fluidity and decreases the density of the high density gypsum.

Figure 4:
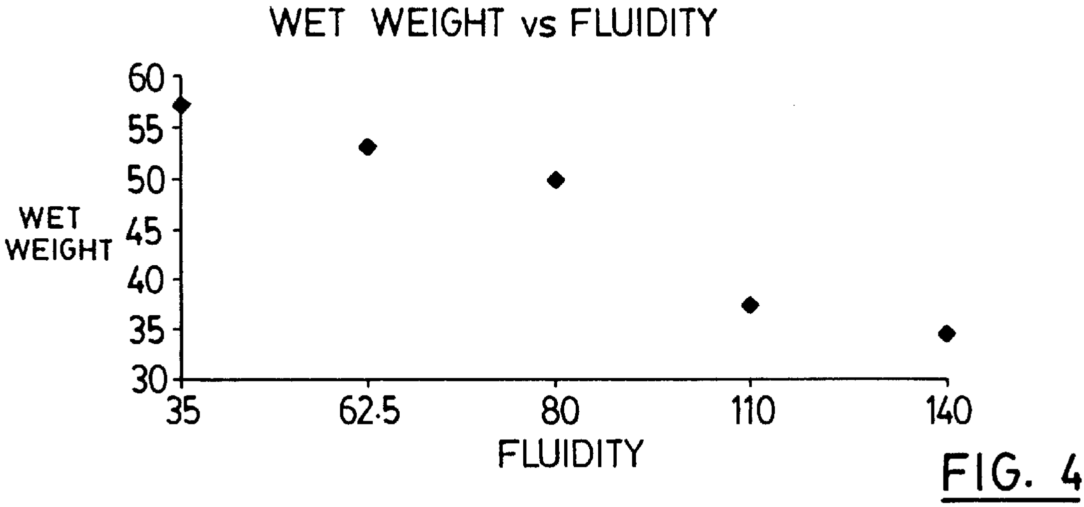
FIG. 4 is a graph showing the relationship between high density gypsum fluidity and the wet weight of gypsum in an example gypsum board produced according to the present invention.

The following table shows the effect of varying the fluidity of the high density gypsum in the production of the example 1.27 cm (½ inch) gypsum board described above, where a 15 cm (6 inch) diameter coating roller 30 is rotating at 207 rpm and the paper tension is 2.587 pounds per linear inch (0.5 kg/cm). Viscosity is measured by a slump test which is standard in the gypsum board industry. The high density layers produced by spreader rollers 30, 72, as mentioned above, have longitudinal ridges formed therein. The tables below give the dry thickness of both the ridges and the main or leveled high density layer or coating. FIG. 4 shows graphically the relationship between fluidity and the wet weight of the gypsum in the example 1.27 cm (½ inch) gypsum board production under discussion.

Parameter varied: FLUIDITY
Constants: Roller R.P.M.: 207; Paper tension: 2.587 pli

| | | Deposited layer data | | | |
|---|---|---|---|---|---|
| Fluidity | Slump | Wet Wt | Dry Wt | Dry thickness | |
| l/hr | (inches) | gms/ft$^2$ | gms/ft$^2$ | Layer (thou) | Ridge (thou) |
| 35 | 7 ¼ | 57.1 | 38 | 27 | 55 |
| 62.5 | 7 ½ | 53 | 34.5 | 22 | 35/40 |
| 80 | 8 ⅛ | 49.7 | 31.7 | 20 | 60 |
| 110 | 8 ¼ | 37.3 | 24 | 17–24 | 40 |
| 140 | 9 | 34.5 | 19.5 | 18–20 | 30/35 |

Figure 5:
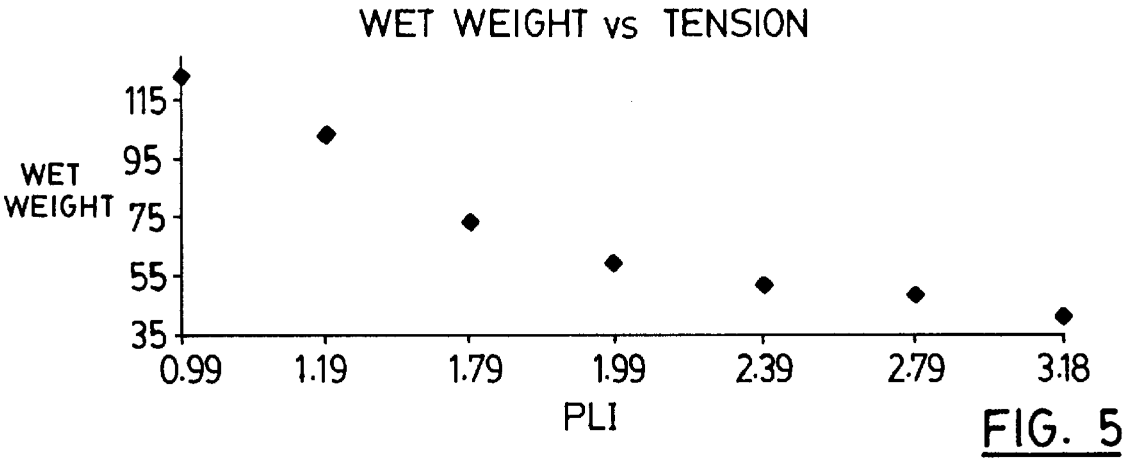
FIG. 5 is a graph similar to FIG. 4, but shows the relationship between paper tension and the wet weight of gypsum.

The following table shows the effect of varying the tension in the example 1.27 cm (½ inch) gypsum board production under discussion. Coating roller speed is 207 rpm and fluidity is 90 liters/hour. FIG. 5 shows graphically the relationship between paper tension and the wet weight of the gypsum in the subject 1.27 cm (½ inch) gypsum board production under discussion.

| | | Parameter varied: | | PAPER TENSION Roller | |
|---|---|---|---|---|---|
| | | Constants: | | R.P.M.: 207 | |
| | | | | Fluidity: 90 l/hr | |
| | | Deposited layer data | | | |
| Tension | | Wet Wt | Dry Wt | Dry thickness | |
| lbs | pli | gms/ft$^2$ | gms/ft$^2$ | Layer (thou) | Ridge (thou) |
| 50 | 0.99 | 123 | 76.2 | 33 | 107 |
| 60 | 1.19 | 103 | 64.1 | 32 | 90 |
| 80 | 1.79 | 73.3 | 46.8 | 25 | 82 |
| 100 | 1.99 | 59.5 | 37.4 | 24 | 80 |
| 120 | 2.39 | 52.1 | 33.3 | 21 | 70 |
| 140 | 2.79 | 48.8 | 31 | 20 | 50 |
| 160 | 3.18 | 41.2 | 26.4 | 19 | 40 |

Figure 6:
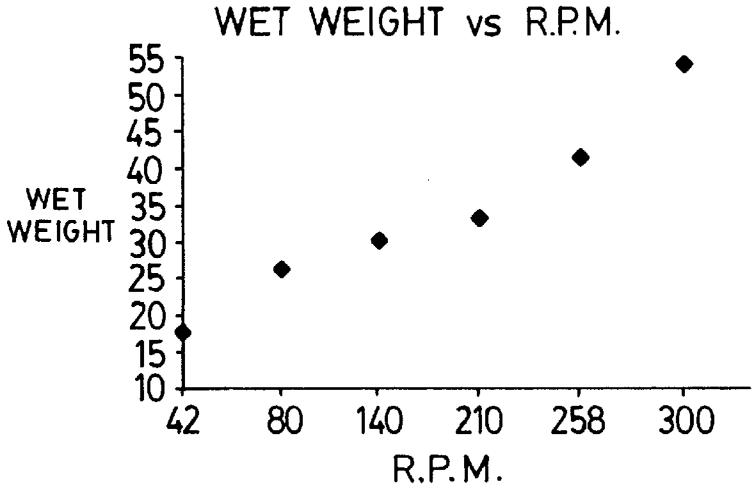
FIG. 6 is a graph similar to FIGS. 4 and 5 but shows the relationship between coating roller speed and the wet weight of gypsum.

The following table shows the effect of varying the coating roller-speed in the example 1.27 cm (½ inch) gypsum board production under discussion. Paper tension 2.587 pounds/linear inch (0.5 kg/cm) and fluidity is 90 liters/hours. Again, FIG. 6 shows graphically the relationship between coating roller speed and the wet weight of the gypsum in the example under discussion.

| | Parameter varied: | | ROLLER R.P.M. | |
|---|---|---|---|---|
| | Constants: | | Tension: 2.587 pli | |
| | | | Fluidity: 90 l/hr | |
| | Deposited Layer Data | | | |
| | Wet Wt | Dry Wt | Dry thickness | |
| R.P.M. | gms/ft$^2$ | gms/ft$^2$ | Layer (thou) | Ridge (thou) |
| 42 | 17.7 | 10.7 | 18 | 30 |
| 80 | 26 | 16 | 21 | 38 |
| 140 | 30 | 18 | 18 | 40 |
| 210 | 33 | 20.2 | 20 | 40 |
| 258 | 41.3 | 25.9 | 20 | 50 |
| 300 | 54.1 | 33.8 | 20 | 50 |

From the above, thus, it will be apparent that all three of the parameters, spreader roller speed, sheet tension and high density slurry viscosity are inter-related and can be adjusted within predetermined limits to give the desired high density coating thickness and prevent the high density gypsum from building up on the coating roller. Alternatively, one or more of the parameters can be held constant and the other parameters varied to prevent the high density gypsum from building up on the spreader roller.

Having described preferred embodiments of the invention, it will be appreciated the various modifications may be made to the apparatus and methods described above. For example, gypsum board could be made with only a single facing sheet 22 by eliminating cover sheet 64 and its associated coating apparatus. Although gypsum board production has been described as a preferred product to be produced by gypsum board machine 10, other types of board could be produced on this apparatus. Other cementitious materials could be used for the core layer and other bond promoting materials could be used between the core layer and the facing sheet, such as various adhesives. Other devices can be used to tension the facing and cover sheets, such as applying braking devices to supply rolls 24 and 66, or varying the speed of conveyor rollers 28 while keeping the input speed of the facing and cover sheets constant. A table with a gap could be used with coating roller 72, and table rollers 70 could be used on either side of coating roller 30. For the purposes of this disclosure, the term "table having an upper surface and a transverse gap therein" is intended to include an arrangement such as table rollers 70, and the like.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Apparatus for producing gypsum board, comprising:

an elongate table having an upper surface for supporting a continuously moving facing sheet thereon, the table having a transverse gap therein dividing the table into an upstream portion and a downstream portion;

a transverse spreader roller located parallel to said upper surface and having an outer surface extending partially into said gap for depressing said facing sheet below the table upper surface;

means for applying longitudinal tension to the facing sheet to control the pressure of the facing sheet against the spreader roller, there being nothing under the facing sheet to press the facing sheet into engagement with the spreader roller;

drive means for rotating the spreader roller outer surface in the same direction as the facing sheet;

means for depositing a coating slurry onto the facing sheet on the upstream portion of the table, the coating slurry being spread over the facing sheet by the spreader roller; and means for applying a core slurry onto the facing sheet on the downstream portion of the table on top of the coating slurry.

2. Apparatus as claimed in claim 1 wherein the drive means for rotating the spreader roller is a variable speed drive adapted to rotate the spreader roller between predetermined minimum and maximum speeds, each of said speeds being such that the surface speed of the spreader roller can be faster than the speed of travel of the facing sheet.

3. Apparatus as claimed in claim 2 wherein the predetermined minimum and maximum speeds can be between 1.2 and 3.5 times the speed of travel of the facing sheet.

4. Apparatus as claimed in claim 1 wherein the means for applying longitudinal tension to the facing sheet includes a transverse, adjustable tension bar located parallel to and bearing against the facing sheet to exert a drag force on the facing sheet.

5. Apparatus as claimed in claim 4 wherein the means for applying longitudinal tension to the facing sheet furthers includes conveyor means located downstream of the table for pulling the gypsum board from the table at a predetermined speed.

6. Apparatus as claimed in claim 5 wherein the length of the spreader roller is less than the width of the facing sheet, and further comprising end scrapers bearing against opposed ends of the spreader roller to keep said ends clean in the event that coating slurry passes around the ends of the spreader roller.

7. Apparatus as claimed in claim 1 wherein the means for applying longitudinal tension to the facing sheet includes an adjustment mechanism connected to the spreader roller for varying the vertical position of the spreader roller and thus the amount the facing sheet is depressed onto said table gap.

8. Apparatus as claimed in claim 7 wherein the means for applying longitudinal tension to the facing sheet further includes conveyor means located downstream of the table for pulling the gypsum board from the table at a predetermined speed.

9. Apparatus as claimed in claim 1 and further comprising means for adjusting the viscosity of the coating slurry.

10. A method of manufacturing gypsum board having at least one facing sheet, a core layer of cementitious material, and an intermediate layer of bond promoting material located therebetween, the method comprising the steps of:

providing a forming table having an upstream portion, a downstream portion and a gap therebetween;

moving a facing sheet at a predetermined speed over the forming table passing over said gap;

depositing bond promoting material on the facing sheet on the upstream portion of the forming table;

providing a co-rotating spreader roller in contact with the facing sheet to spread the bond promoting material over the facing sheet, the spreader roller extending into said gap;

tensioning the facing sheet so that said tension urges the facing sheet against the spreader roller, said tension controlling the pressure of the facing sheet against the spreader roller, there being nothing under the facing sheet to press the facing sheet into engagement with the spreader roller; and applying a core layer of cementitious material on top of the bond promoting material on the downstream portion of the forming table.

11. A method as claimed in claim 10 wherein the core layer material is low density gypsum slurry and the bond promoting layer is high density gypsum slurry.

12. A method as claimed in claim 11 wherein the rotational speed of the spreader roller is increased and decreased within a predetermined range to respectively increase and decrease the minimum thickness of the high density gypsum layer.

13. A method as claimed in claim 12 and wherein the facing sheet tension is increased and decreased within a predetermined range thereby tending respectively to decrease and increase the minimum thickness of the high density gypsum layer.

14. A method as claimed in claim 13 and further comprising the step of increasing and decreasing the viscosity of the high density gypsum within a predetermined range thereby tending respectively to increase and decrease the minimum thickness of the high density gypsum layer.

15. A method as claimed in claim 14 and further comprising the step of selecting the spreader roller speed, facing sheet tension and high density gypsum viscosity to produce a predetermined high density gypsum layer minimum thickness and prevent the high density gypsum from building up on the coating roller.

16. A method as claimed in claim 13 and further comprising the step of setting the spreader roller speed at a predetermined speed and adjusting the facing sheet tension sufficiently high to prevent high density gypsum from building up on the spreader roller.

17. A method as claimed in claim 13 and further comprising the step of setting the facing sheet tension at a predetermined tension and adjusting the spreader roller speed sufficiently high to prevent the high density gypsum from building up on the spreader roller.

18. A method as claimed in claim 13 wherein more high density gypsum is deposited onto the facing sheet than is formed into said high density gypsum layer, and further comprising the steps of adjusting the spreader roller speed and facing sheet tension such that some of the high density gypsum flows around the ends of the spreading roller to form high density edges on the gypsum board.

19. A method as claimed in claim 11 wherein the facing sheet tension is increased and decreased within a predetermined range to respectively decrease and increase the minimum thickness of the high density gypsum layer.

20. A method as claimed in claim 11 and further comprising the step of increasing and decreasing the viscosity of the high density gypsum within a predetermined range to respectively increase and decrease the minimum thickness of the high density gypsum layer.

* * * * *